(12) United States Patent
Whitehead et al.

(10) Patent No.: US 6,639,413 B2
(45) Date of Patent: Oct. 28, 2003

(54) SYSTEM AND METHOD FOR CALIBRATION OF DATA IN AN ELECTRIC POWER MONITORING SYSTEM

(75) Inventors: David E. Whitehead, Pullman, WA (US); Gregory C. Zweigle, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 09/900,404

(22) Filed: Jul. 6, 2001

(65) Prior Publication Data

US 2003/0011353 A1 Jan. 16, 2003

(51) Int. Cl.$^7$ .................. G01R 35/00; G01R 25/00; G01R 29/00; G01R 13/02; H02H 3/38
(52) U.S. Cl. ............... 324/601; 324/76.77; 324/76.79; 324/76.82; 702/106; 702/65; 307/127; 361/78; 361/85
(58) Field of Search .................. 324/532, 76.79, 324/76.54, 86, 107, 601, 622, 76.77, 76.82; 361/78, 85; 702/72, 60, 65, 106, 89; 307/127, 14; 340/310.04; 704/213

(56) References Cited

U.S. PATENT DOCUMENTS 5,453,697 A * 9/1995 Schweer et al. ............ 324/601

\* cited by examiner

*Primary Examiner*—Anjan K. Deb
(74) *Attorney, Agent, or Firm*—Jensen & Puntigam, P.S.

(57) ABSTRACT

The error compensating system and method is used in electric power monitoring systems, e.g. protective relays, and includes a test unit for applying a test signal to the front end of a data acquisition section of the power monitoring system and a phase reference module which converts the test signal to a square wave having falling and rising edges corresponding to transitions between the positive and negative portions of the test signal. A programmable logic device determines the zero crossings of the sampled digital signal from the data acquisition system and then determines the time difference between a falling edge of the module output signal and the zero crossing of the sampled digital signal. The time difference is representative of the phase shift produced by the data acquisition components. A compensation circuit adjusts the digitally sampled signals with the amount of the determined phase shift.

14 Claims, 3 Drawing Sheets

SYSTEM AND METHOD FOR CALIBRATION OF DATA IN AN ELECTRIC POWER MONITORING SYSTEM

TECHNICAL FIELD

This invention relates generally to electric power monitoring systems and more specifically concerns correction of phase and magnitude errors introduced by certain components of the monitoring system, in particular the data acquisition components thereof.

BACKGROUND OF THE INVENTION

The operating efficiency of electric power systems has recently become of greater importance in the electric power industry. Electric power producers and providers are now generally attempting to use their existing power generation plants and transmission lines to a high, if not maximum, capacity, due to consistent increase in customer demand combined with little or no increase in capacity over the past several years.

In order to operate at maximum efficiency, the electric power producers and providers must know how their systems are performing, including the efficiency at which their systems transport power. Power system protective relays are used to monitor efficiency, as they are typically located throughout the power system and have the required ability to measure currents and voltages on the power line and then to determine how the power system is operating.

Monitoring of the power system to optimize operation, and hence revenues, requires high signal acquisition and processing accuracy, within ±1/10% (0.1%) or better. Historically, however, protective relays, which have in the past been used for detecting and isolating abnormal, i.e. fault, conditions in the power system could provide satisfactory results for those purposes with accuracies of 2–4%, or even higher.

Errors are typically produced in the data acquisition section of the protective relay. The data acquisition section obtains electric current and/or voltage quantities from the power transmission line on the separate channel inputs and operates on them to produce signals which can then be processed with a protection algorithm. The data acquisition section, however, introduces both phase and magnitude errors into the current and voltage signals obtained from the power line. The components in the data acquisition system responsible for the errors include current and voltage transformers (CTs and VTs), low pass filters (LPFs), analog to digital converters (A/D converters) and multiplexers.

A typical data acquisition section is shown in FIG. 1. It includes a plurality of analog data channels, receiving, for instance, the three phases A, B, and C of a three phase power signal (current and/or voltage quantities). The three phases from the power line on the several channels are applied to a CT or VT element, shown generally at 12, depending upon whether the inputs are currents or voltages, a low pass filter 14, and then to a multiplexer 16, along with signals from other channels. The output from the multiplexer 16 is applied to an analog-to-digital (A/D) converter 18, the output of which is applied to a programmable logic device 20, such as a microprocessor or other similar device, which processes the digitized data by protection algorithms to monitor the operation of the power system.

Briefly in operation, the data (electric current quantities or voltage quantities from the power line) in each analog channel is periodically sampled, under the control of the programmable logic device, applied to a CT or VT as appropriate, then to the low pass filter and from there to the multiplexer. The programmable logic device selects the channels to be sampled in a programmed sequence. The A/D converter 18 converts the analog information from multiplexer 16 to digital data which is then processed by the protection algorithms in the programmable logic device. This process continues until samples from all of the channels have been processed. The cycle is repeated at regular intervals during a power system cycle, e.g. 16 times per cycle or at some other fixed rate.

Ideally, the current/voltage data which is provided by the A/D converter to the programmable logic device is identical or substantially identical in all respects to the current/voltage signal obtained from the power line, at the corresponding point in time of sampling of the analog quantity.

It is well known that errors are introduced into the acquired signal by the individual components in the data acquisition section of the protection system. Further, the introduced errors vary unpredictably from component to component; each receive channel in the relay will thus have different error levels. These errors include both magnitude and phase errors. Some components, such as CTs, introduce both magnitude and phase errors, while other elements, such as the low pass filters, introduce only a phase shift, which is frequency dependent. In addition, the analog multiplexer 16 and the A/D converter can only operate on one channel at a time. Hence, there will be an inherent phase difference between the successive channels for the output of the A/D converter.

Various attempts have been made to compensate for the magnitude errors and phase delays in the data acquisition section of the protective relay. One method of magnitude calibration is to apply a known signal to the CT/VT inputs and compare them to the digital value at the output of the A/D converter. The difference is then calculated as a gain factor, and this gain factor is used to correct the output of the A/D converter, prior to the application of the digital signal as an input to the programmable logic device.

For phase shift corrections, adjustments can be made to the individual hardware components to correct phase error. However, this is expensive and labor intensive.

Correction to differences in phase between the channels due to sequential sampling may be accomplished by various techniques, including rotation of sampling points or reversal of sampling sequence, but these do not correct the phase shift introduced by the action of the individual components themselves. It is thus desirable, in order to accomplish the accuracy required in the monitoring of modern power systems, to reduce both magnitude and phase errors down to a very small percentage and to account for all sources of such errors, including a change in error as the magnitude of the input signal changes.

DISCLOSURE OF THE INVENTION

Accordingly, the present invention is a system and corresponding method for compensating for errors introduced into electric power monitoring systems by a data acquisition section thereof, which in operation is responsive to analog quantities from an electric power line to produce sampled digital signals which are used in a monitoring algorithm, the system comprising: a test unit for applying a sinusoidal test input signal to a front end portion of the data acquisition section; a processing module to which the test input signal is also applied for converting the test signal to a module output signal having falling and rising edges corresponding to transitions between positive and negative portions of the sinusoidal test signal; means for determining a zero crossing of the sampled digital signal and for determining the time difference between an edge of the module output signal and said zero crossing of the sampled digital signal, wherein said time difference is representative of the phase shift produced by the data acquisition section; and a compensation circuit for phase adjusting the sampled digital signals in accordance with said time difference.

BEST MODE FOR CARRYING OUT THE INVENTION

The present invention is a system and method for correcting errors introduced in the data acquisition section of an electric power monitoring system, specifically the various components comprising the data acquisition section. As indicated above, these components include both CTs and VTs, low pass filters, a multiplexer, and an analog-to-digital (A/D) converter. Typically, the analog input quantities to the data acquisition section will have a frequency of approximately 60 Hertz and in the case of current quantities, a nominal magnitude of approximately 5 amps.

In the present invention, the necessary correction, both magnitude and phase, for the introduced errors is first determined; correction is then applied to the digitized data, in effect calibrating the device to account for the introduced errors. As indicated above, a significant challenge in any error correction system is that the phase error, and to an extent the magnitude error as well, does not remain constant but varies depending upon the magnitude of the input signal, i.e. the power demand on the system. Hence, the magnitude and phase error when the five amp nominal current input signal is at one amp in magnitude will be different than when the input signal is at three amps. Hence, an error correction (calibration) system which satisfies the high accuracy requirements (±0.1%) for monitoring of power transmission requires that the change in error with change in magnitude of the input signal be taken into account.

Figure 1:
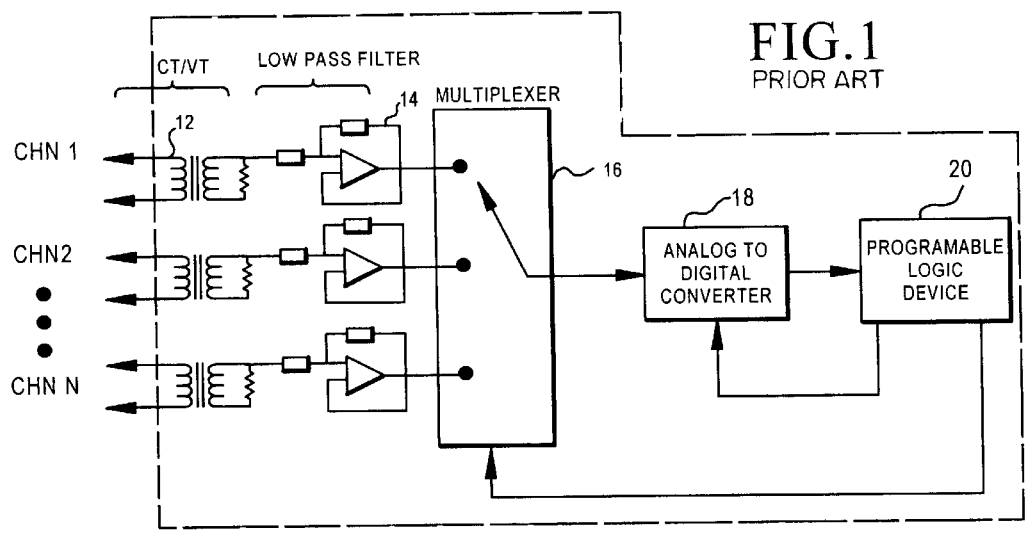
FIG. 1 is a diagram of the principal sections of a protective relay, including the data acquisition section thereof, known in the prior art.
Figure 2:
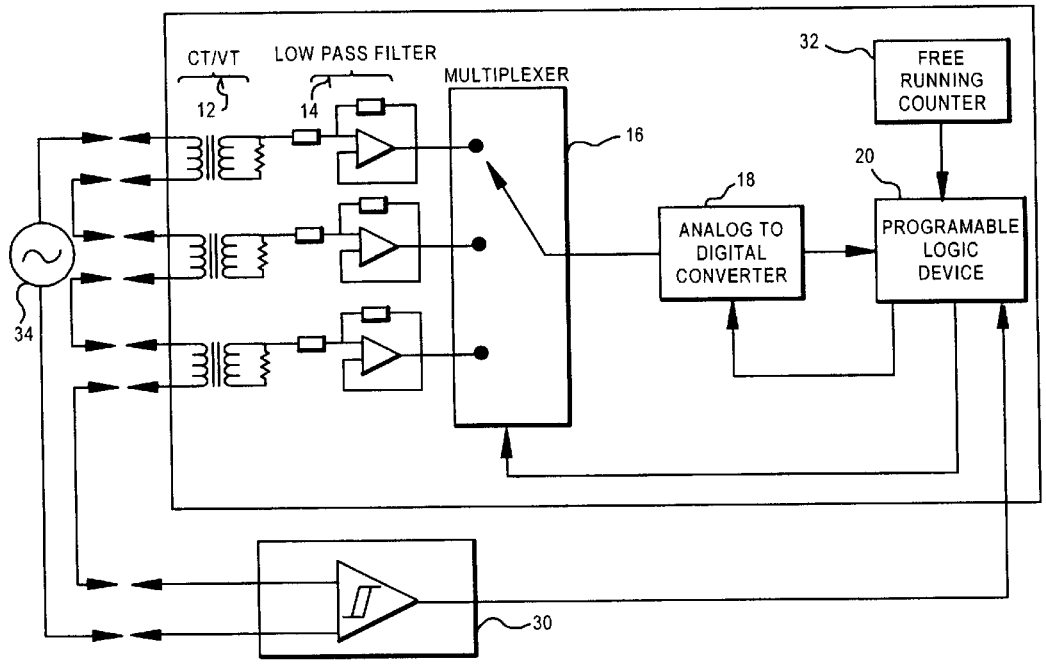
FIG. 2 is a diagram of the system of the present invention for determining the calibration required to correct errors introduced by the components of the data acquisition section of a protective relay.

The system of the present invention is shown in FIG. 2. FIG. 2 includes the data acquisition section of a protective relay like FIG. 1, but adds a phase reference module 30 and a free running counter 32. Calibration is accomplished with a test source 34 which applies a typical power line signal to the CT/VT portion 12 and to a phase reference module 30. The signal from test source 34 emulates a power line signal which the relay would obtain from the power line in ordinary operation. The magnitude correction provided by the present system is obtained by determining the output from A/D converter 18, referred to as the calculated value $M_{CALC}$, and dividing this value by the magnitude of the test source signal, referred to as $M_{APPLIED}$. The result is a magnitude correction factor $M_{CORR}$.

This magnitude correction factor is determined at a plurality of magnitude set points, also referred to as calibration points. Typically, eight to twenty calibration points are used, with more calibration points located toward the lower magnitude points, since at the lower magnitudes, the error changes more rapidly.

At the same time that the magnitude error correction is being determined, the protective relay, specifically the logic processor 20, is calculating the phase delay/error created by the data acquisition components. The phase delay is also determined at each selected calibration point, since the phase delay will also vary depending upon the particular magnitude of the signal.

The determination of the phase delay at each of the calibration points is also accomplished by the circuit of FIG. 2. As indicated above, the test signal from source 34 is applied to the input of phase reference module 30. Module 30 is a conventional device which converts the sinusoidal test signal into a square wave output (between zero and a positive value) having negligible phase delay relative to the input test signal. The positive portion of the sinusoid input is represented by a zero portion of the square wave with the negative portion of the sinusoid represented by a positive portion of the square wave. The zero crossings of the sinusoid are represented by the transitions between the positive portion and the zero portion of the square wave.

The phase reference module 30 in the embodiment shown comprises a voltage divider, which acts to step the high voltage sinusoid input down to a low voltage sinusoid, in combination with a comparator which converts the low voltage sinusoid to a digital square wave signal suitable for application to digital integrated circuits.

The output of module 30 is applied as one input to logic processor 20. The output of free running counter 32 is also applied to processor 20. When the output of module 30 changes state, in particular at a falling edge, the corresponding time instant of the free running counter is latched and the time recorded, which is hereinafter referred to as $T_{PRM}$. The output of the A/D converter is also monitored and the next zero crossing of that device is determined. This is done by continuously sampling (8 kHz rate in the embodiment shown) the output of the A/D converter. These determinations can be done on a channel by channel basis or can be done once by one pass of all the channels, or can be done on a single channel with the rest of the channels being referenced to that single channel. In the latter case, additional processing is necessary to adjust the counter 32 value for the delays caused by the multiplexer in the sampling sequence of the channels.

As indicated above, for a falling edge (from high to low) of the square wave signal from the phase reference module 30, the programmable logic device 20 will latch the free running counter 32 and will store that value as $T_{PRM}$. The next zero crossing of the sampled signal from the A/D converter is then calculated for each channel, using a straightforward interpolation formula. Interpolation is necessary because the actual zero crossing will most likely occur between successive samples.

$$T_X = \frac{(T_P - T_{P-1}) \cdot (A_{P-1})}{(A_P - A_{P-1})} - T_{P-1}$$

where $T_X$=zero crossing time relative to the count of the free running counter, $T_P$=time of the first positive sample, $T_{P-1}$= time of the last negative sample relative to count of the free running counter, $A_P$=the magnitude of the first positive sample, and $A_{P-1}$=magnitude value of the last negative sample.

Figure 3A:
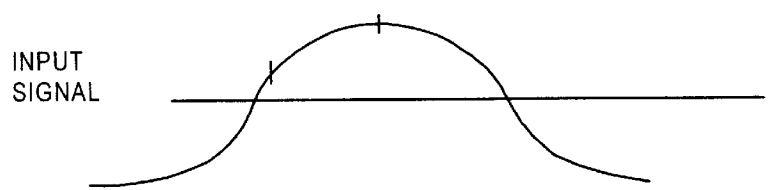
FIG. 3 is a diagram showing an input signal to the data acquisition system and the digitized data at a selected instantaneous time relative to the input signal.
Figure 3B:
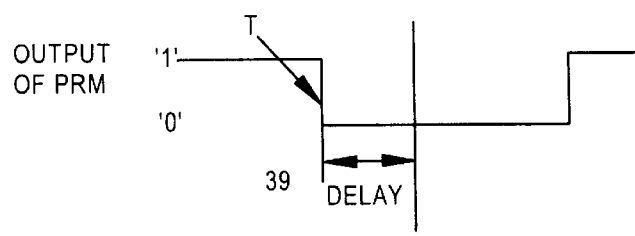
Figure 3C:
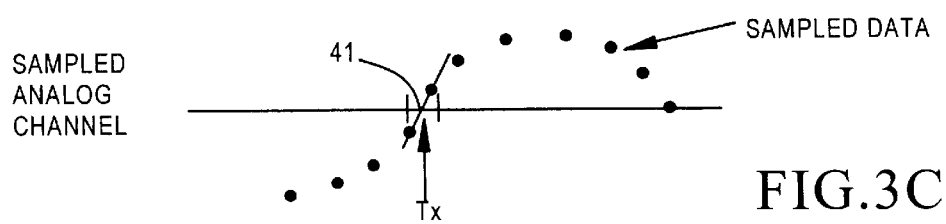

FIGS. 3A–3C show the relationship between the input signal from the test source (FIG. 3A), the square wave signal from module 30 (FIG. 3B), and the sampled data from the A/D converter 18 (FIG. 3C), with FIG. 3C being instantaneous at one selected magnitude of the input signal. FIG. 3C will change (shifting to the left or right) as the input signal FIG. 3A changes magnitude. At a lower input signal magnitude than shown in FIG. 3, the sampled data will be shifted somewhat to the left, resulting in a slightly less delay, while as the magnitude of the input signal increases, the phase shift will increase, moving somewhat to the right. The change in phase shift is not linear. It changes in a nonlinear fashion as the magnitude of the input signal changes. The phase delay is the time difference between $T_{PRM}$ 39 and the zero crossing $T_X$ (41) of the A/D sampled signal for the analog channel. That phase delay is the total delay for all the components between the test source and the processor 20, for one channel. With this known delay, each analog channel can be precisely corrected (calibrated) to a common reference point in time.

Figure 4:
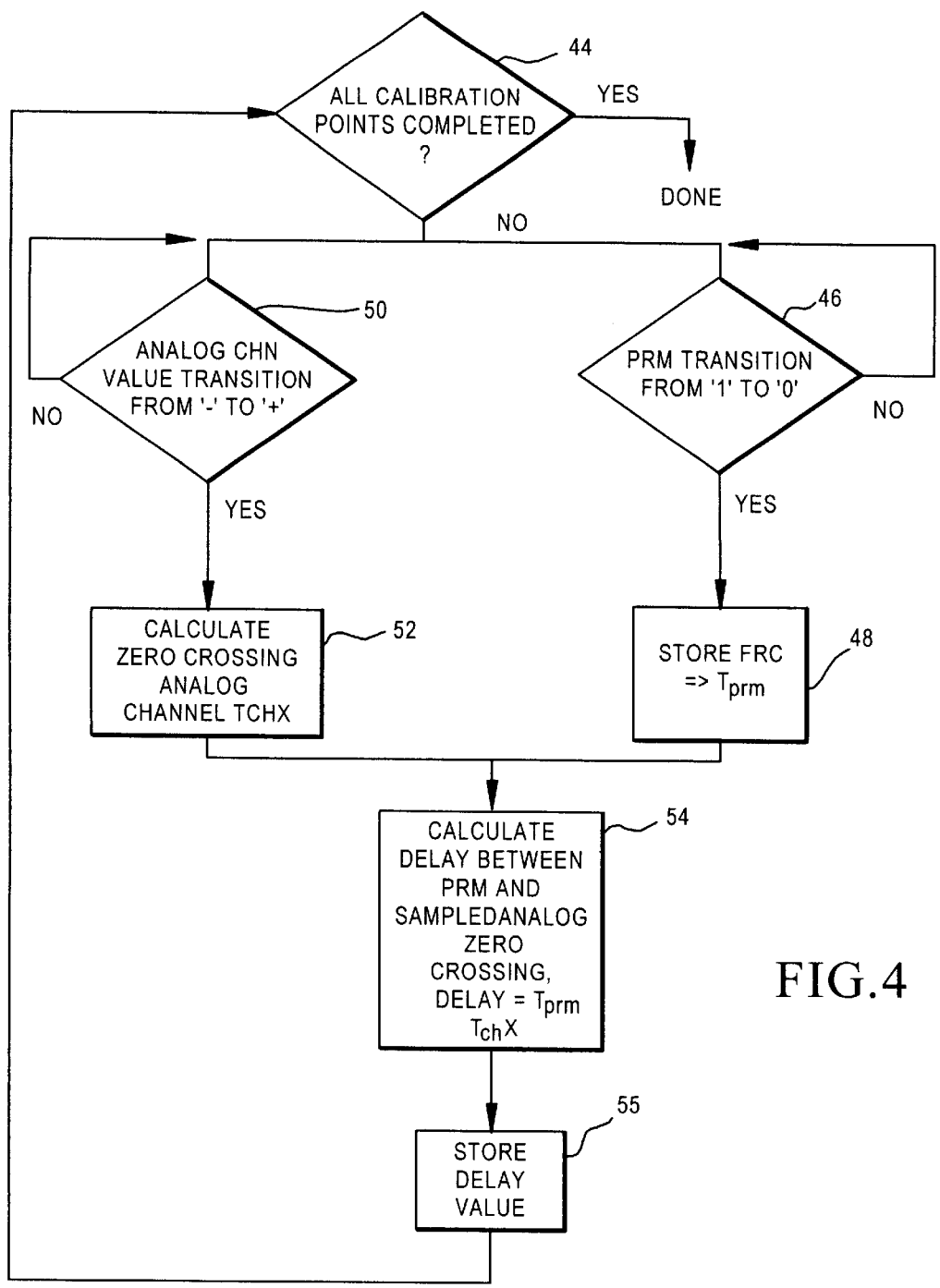
FIG. 4 is a diagram showing the series of process steps in the calibration system of the present invention.

FIG. 4 shows the software flow chart for accomplishing the correction (calibration) determination explained above. This correction covers the total (absolute) phase shift for each channel. In step 44, it is first determined whether or not the correction determination has been made for all of the calibration points for a single input signal cycle. The routine of FIG. 4 loops back until the correction determination has been accomplished for all the calibration points. If any calibration points remain to be completed, the transition from "1" to "0" (falling edge) of the square wave from module (PRM) 30 is determined, at step 46. The routine loops back until a transition is recognized. When the transition occurs, the time count in the free running counter 32 is stored. The stored time is referred to as $T_{PRM}$, at step 48.

The analog channel A/D converter sampled output is also interrogated, at step 50. If there is no transition from negative to positive, i.e. the first recognition of a positive sample in the cycle, the routine loops back, at the rate of 8 kHz, i.e. every 125 microseconds, until a positive value is recognized, which indicates that a zero crossing has occurred in the sampled A/D signal. The actual zero crossing is calculated at step 52. The zero crossing time will be an interpolation in time between the first positive sample count and the previous count. After the zero crossing time has been calculated relative to the free running counter, the difference between the stored time $T_{PRM}$ of the transition of the signal from the module and the time of the zero crossing of the sampled signal from the A/D converter is determined, at step 54. This difference value is the time delay for one calibration point, i.e. one particular input signal magnitude. That one phase delay value is then stored (step 55), associated with that magnitude calibration point.

As indicated above, this process continues until all the selected calibration points for the input signal have been completed. Typically this will be on the order of eight to twenty individual calibration points, but the number could be a different; further, the selected magnitude points could be different.

After all the delay times have been determined, a table is formulated and stored in memory, with the phase delay times associated with each of the calibration points, so that an accurate representation in the change of phase delay relative to change in the magnitude of input signal is obtained. When the routine of FIG. 4 is completed, a very accurate phase correction table has been obtained for one channel in the protection system. The same process is carried out for each channel in the relay. The correction will vary from channel to channel because of the differences in the individual components of each data acquisition channel.

The phase corrections and the magnitude corrections will then be used to adjust or correct the output from the A/D converter output of each channel for use in determining the operating condition/efficiency of the power system. In effect this adds phase shift and magnitude adjustment to the sampled analog data. The delay caused by the data acquisition hardware, both in phase and magnitude, is determined at each calibration point. The added phase delay at each calibration point produces a net effect of a constant phase delay over the entire cycle. All the individual channels have an individual phase shift which in total will be equal to the largest total phase shift of any individual channel. Hence, the sampled signal from the A/D converter for each channel are exact replicas (within 0.1%) of the input signal to the data acquisition section.

The conversion of a time delay to actual phase (angle) delay can be based upon a 60 Hertz input signal. Other input frequencies can be used. It is known that the phase difference for the analog components can be leading or lagging relative to the falling edge of the module This is a function of the CTs/VTs, as well as the magnitude of the input signals.

The overall correction formula for the output of the digital sampled data is:

$$Y=(X[n-S-1]-X(n-S)\cdot T+X[n-S]-DC)\cdot M$$

where Y=total magnitude, phase and DC offset corrected value, X=uncorrected value sampled, S=a positive integer in the range of $\geq 0$, T=a value in the range of 0–1, inclusive of 0 and exclusive of 1, M= magnitude correction factor, DC=DC offset, and n= sample time index.

The above correction is for one channel only and will vary from channel to channel. The result is a calibrated data acquisition system which corrects errors in both phase and magnitude introduced by the various components of the data acquisition system portion of the protective relay. The system results in a monitoring system where the transmission of power can be accurately monitored to within 0.1%, and even better.

Although a preferred embodiment has been disclosed for purposes of illustration, it should be understood that various changes, modifications, and substitutions may be incorporated into the embodiment without parting from the spirit of the invention which is defined by the claims which follow;

What is claimed is:

1. A system for compensating for errors introduced into electric power monitoring systems by a data acquisition section thereof, which in operation is responsive to analog quantities from an electric power line to produce sampled digital signals which are used in a monitoring algorithm, the system comprising:

a test unit for applying a sinusoidal test input signal to a front end portion of the data acquisition section;

a processing module to which the test input signal is also applied for converting the test signal to a module output signal having falling and rising edges corresponding to transitions between positive and negative portions of the sinusoidal test signal;

means for determining a zero crossing of the sampled digital signal and for determining the time difference between an edge of the module output signal and said zero crossing of the sampled digital signal, wherein said time difference is representative of the phase shift produced by the data acquisition section; and a compensation circuit for phase adjusting the sampled digital signals in accordance with said time difference.

2. A system of claim 1, wherein the time difference is determined at a plurality of selected input signal magnitude calibration points.

3. A system of claim 2, including means for determining the difference in magnitude between the test signal and the sampled digital signal at each calibration point and wherein the magnitude of the sampled digital signal is corrected in accordance with said difference.

4. A system of claim 2, including means for storing the time difference associated with each calibration point, and wherein the sampled digital signals are adjusted at each calibration point in accordance with each stored time difference.

5. A system of claim 1, wherein the data acquisition section includes voltage and current transformers, low pass filters, a multiplexer, and a digital-to-analog converter.

6. A system of claim 1, wherein the module is a phase reference module and the module signal is a square wave, wherein a positive portion of the sinusoidal test signal is represented by a zero portion of the square wave and wherein a negative portion of the sinusoidal test signal is represented by a positive portion of the square wave and wherein zero crossings of the sinusoidal test signal are represented by transitions between the positive and zero portions of the square wave.

7. A system of claim 1, wherein the system includes a free running counter, wherein the free running counter is latched and the count is determined when the zero crossing occurs and when the edge of the module output signal occurs.

8. A system of claim 7, wherein the zero crossing is interpolated between the first positive digital sample and the sample at the previous count.

9. A system of claim 1, wherein said edge of the module output signal is a falling edge.

10. A method for compensating for errors introduced into electric power monitoring systems by a data acquisition section thereof, which in operation is responsive to analog quantities from an electric power line to produce sampled digital signals which are used in a monitoring algorithm, the method comprising the steps of:

applying a sinusoidal test input signal to a front end portion of the data acquisition section;

applying the test input signal to a processing module which convert the test signal to a module output signal having falling and rising edges corresponding to transitions between positive and negative portions of the sinusoidal test signal;

determining a zero crossing of the sampled digital signal and determining the time difference between an edge of the module output signal and said zero crossing of the sampled digital signal, wherein said time difference is representative of the phase shift produced by the data acquisition section; and adjusting the phase of the sampled digital signals in accordance with said time difference.

11. A method of claim 10, wherein the time difference is determined at a plurality of selected calibration points over the test signal cycle.

12. A method of claim 10, including the step of determining the difference in magnitude between the test signal and the sampled digital signal at each calibration point and correcting the magnitude of the sampled digital signal in accordance with said difference.

13. A method of claim 10, wherein the module is a phase reference module and the module signal is a square wave, wherein a positive portion of the sinusoidal test signal is represented by a zero potion of the square wave and wherein a negative portion of the sinusoidal test signal is represented by a positive portion of the square wave and wherein zero crossings of the sinusoidal test signal are represented by transitions between the positive and zero portions of the square wave.

14. A method of claim 11, including the step of storing the time difference associated with each calibration point, and the step of adjusting the sampled digital signals at each calibration point in accordance with each stored time difference.

* * * * *